United States Patent
McGrew et al.

(10) Patent No.: US 7,350,227 B2
(45) Date of Patent: Mar. 25, 2008

(54) CRYPTOGRAPHIC PEER DISCOVERY, AUTHENTICATION, AND AUTHORIZATION FOR ON-PATH SIGNALING

(75) Inventors: David A. McGrew, Poolesville, MD (US); Melinda L. Shore, Ithaca, NY (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 11/115,542

(22) Filed: Apr. 26, 2005

(65) Prior Publication Data

US 2006/0242408 A1 Oct. 26, 2006

(51) Int. Cl.
*H04L 9/00* (2006.01)
*G06F 17/00* (2006.01)
*G06F 15/16* (2006.01)
*H04K 1/00* (2006.01)
*G06F 9/00* (2006.01)

(52) U.S. Cl. .......................... 726/1; 726/12; 713/153; 713/168

(58) Field of Classification Search .................. 726/1, 726/12; 713/153, 168
See application file for complete search history.

(56) References Cited

U.S. PATENT DOCUMENTS

| | | | |
|---|---|---|---|
| 5,268,962 A | 12/1993 | Abadi et al. | |
| 5,668,878 A | 9/1997 | Brands | |
| 5,961,601 A | 10/1999 | Iyengar | |
| 5,963,915 A | 10/1999 | Kirsch | |
| 6,134,592 A | 10/2000 | Montulli | |
| 6,253,326 B1 | 6/2001 | Lincke et al. | |
| 6,263,437 B1 | 7/2001 | Liao et al. | |
| 6,496,932 B1 | 12/2002 | Trieger | |
| 6,904,521 B1 | 6/2005 | Jivsov | |
| 6,938,171 B1 | 8/2005 | Isomichi et al. | |
| 2004/0015725 A1 | 1/2004 | Boneh et al. | |
| 2004/0030925 A1 | 2/2004 | Raheman | |
| 2005/0154873 A1 | 7/2005 | Cam-Wing et al. | |

OTHER PUBLICATIONS

Baker, F. et al. "RSVP Cryptographic Authentication", RFC 2747, Jan. 2000, <ftp://ftp.rfc-editor.org/in-notes/rfc2747.txt>.*

(Continued)

*Primary Examiner*—Kambiz Zand
*Assistant Examiner*—Michael J Simitoski
(74) *Attorney, Agent, or Firm*—Hickman Palermo Truong & Becker LLP

(57) ABSTRACT

A method is disclosed for cryptographic peer discovery, authentication, and authorization. According to one embodiment, a data packet, which is addressed to a destination device other than an intermediary network device, is intercepted at the intermediary network device. The data packet contains a request and a group identifier. A shared secret cryptographic key, which is mapped to the group identifier, is selected. A challenge is sent toward an upstream device from whence the data packet came. A response is received. A verification value is generated based on the cryptographic key and the challenge. It is determined whether the response matches the verification value. If the response matches the verification value, then it is determined whether the request is allowed by an authorization set that is mapped to the group identifier. If the request is allowed, then a policy of the intermediary network device is configured based on the request.

21 Claims, 4 Drawing Sheets

OTHER PUBLICATIONS

Braden, R. et al. "Resource ReSerVation Protocol (RSVP)—Version 1 Functional Specification", RFC 2205, Sep. 1997, <ftp://ftp.rfc-editor.org/in-notes/rfc2205.txt>.*

Herzog, S. "RSVP Extensions for Policy Control", RFC 2750, Jan. 2000, <ftp://ftp.rfc-editor.org/in-notes/rfc2750.txt>.*

Baker, F. et al., "RSVP Cryptographic Authentication," Network Working Group, Request for Comments: 2747, Jan. 2000, located at http://www.ietf.org/rfc/rfc2747.txt?number=2747, retrieved on Aug. 2, 2005, pp. 1-20. (Reference provided on enclosed CD-ROM).

Berners-Lee, T. et al., "Hypertext Markup Language—2.0," Nov. 1995, Network Working Group, Request for Comments: 1866, located at http://www.ietf.org/rfc/rfc1866.txt?number=1866, retrieved on Jul. 10, 2003, pp. 1-72. (Reference provided on enclosed CD-ROM).

Braden, R. et al., "Resource ReSerVation Protocol (RSVP), Version 1 Functional Specification," Network Working Group, Request for Comments: 2205, Sep. 1997, Located at http://www.ietf.org/rfc/rfc2205.txt?number=2205, retrieved on Aug. 2, 2005, pp. 1-105. (Reference provided on enclosed CD-ROM).

Fielding ,R. et al., "Hypertext Transfer Protocol—HTTP/1.1," Jan. 1997, Network Working Group, Request for Comments: 2068, located at http://www.ietf.org/rfc/rfc2068.txt?number=2068, retrieved on Jul. 10, 2003, pp. 1-152. (Reference provided on enclosed CD-ROM).

Dierke, T. et al., "The TLS Protocol-Version 1.0," Network Working Group, RFC 2246, Jan. 1999, 80 pages.

Birk, Yithak, "Coding On Demand by an Informaed Source (ISCOD) for Efficient Broadcast of Different Supplemental Data to Caching Clients," IEEE Transactions on Information Theory, vol. 52, No. 6, Jun. 2006, pp. 2825-2830.

Phatak, S.H., et al., "Web&: An Architecture for Non-Interactive Web," Internet Applications, 2001, WIAPP 2001, Proceedings of the Second IEEEE Workshop on Jul. 23-24, 2001, pp. 104-112.

Yao, Bin et al., "Proxy-based Recovery for Applications on Wireless Hand-held Devices," Reliable Distributed Systems 2000, SRDS-2000, Proceedings of the 19th IEEE Symposium on Oct. 16-18, 2000. pp. 2-10.

Dierks, T. et al., "The TLS Protocol-Version 1.0," Network Working Group, RFC 2246, Jan. 1999, retrieved from the internet at http://rfc.sunsite.dk/rfc/rfc2246.html, retrieved on Jul. 21, 2006, pp. 1, 4, 29-32, 68-69.

International Searching Authority "Notification of Transmittal of The International Search Report and The Written Opinion of the International Searching Authority, or the Declaration", PCT/US06/11479, dated May 1, 2007, 8 pages.

International Searching Authority, "Notification of Transmittal of the International Search Report and the Written Opinion of the International Searching Authority, or the Declaration," PCT/US05/00812, dated Jun. 14, 2006, 6 pages.

Claims, PCT/US05/00812, 10 pages. (Jun. 14, 2006).

Jonsson, J. et al., "Public-Key Cryptography Standards (PKCS) #1: RSA Cryptography Specifications Version 2.1," Feb. 2003, Network Working Group, Request for Comments: 3347, located at http://www.ietf.org/rfc/rfc3447.txt?number=3447, retrieved on Jul. 10, 2003, pp. 1-68. (Reference provided on enclosed CD-ROM).

Kaliski, B. et al., "PKCS #1: RSA Cryptography Specifications Version 2.0," Oct. 1998, Network Working Group, Request for Comments: 2437, located at http://www.ietf.org/rfc/rfc2437.txt?number=2437, retrieved on Jul. 10, 2003, pp. 1-37. (Reference provided on enclosed CD-ROM).

Kaliski, B., "PKCS #1, RSA Encryption Version 1.5," Mar. 1998, Network Working Group, Request for Comments: 2313, located at http://www.ietf.org/rfc/rfc2313.txt?number=2313, retrieved on Jul. 10, 2003, pp. 1-18. (Reference provided on enclosed CD-ROM).

Wason, Thomas, et al., "Liberty ID-FF Architecture Overview, Version 1.2," Liberty Alliance Project, located at www.projectliberty.org/, pp. 1-44. (Reference provided on enclosed CD-ROM), 2003.

Yadav, S. et al., "Identity Representation for RSVP," Network Working Group, Request for Comments: 3182, Oct. 2001, Located at http://www.ietf.org/rfc/rfc3182.txt?number=3182 , retrieved on Aug. 2, 2005, pp. 1-17. (Reference provided on enclosed CD-ROM).

* cited by examiner

CRYPTOGRAPHIC PEER DISCOVERY, AUTHENTICATION, AND AUTHORIZATION FOR ON-PATH SIGNALING

RELATED APPLICATIONS

This application is related to U.S. patent application Ser. No. 10/756,634, entitled "ENABLING STATELESS SERVER-BASED PRE-SHARED SECRETS", filed Jan. 12, 2004; U.S. patent application Ser. No. 10/756,633, entitled "AVOIDING SERVER STORAGE OF CLIENT STATE", filed Jan. 12, 2004; and U.S. patent application Ser. No. 10/411,964, entitled "METHOD AND APPARATUS FOR SECURELY EXCHANGING CRYPTOGRAPHIC IDENTITIES THROUGH A MUTUALLY TRUSTED INTERMEDIARY", filed Apr. 10, 2003. The entire contents of these applications are hereby incorporated by reference in their entirety for all purposes as if fully set forth herein.

FIELD OF THE INVENTION

The present invention generally relates to authentication, authorization, and peer discovery mechanisms for computer networks. The invention relates more specifically to a method and apparatus for cryptographic peer discovery, authentication, and authorization for on-path signaling.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In packet-switched networks consisting of multiple network elements such as routers and switches, an on-path signaling protocol such as Resource Reservation Protocol ("RSVP") may be used to reserve routing paths for the purpose of providing optimized routing of specified kinds of network traffic, such as voice traffic. RSVP is described in Braden et al., "Resource ReSerVation Protocol (RSVP)—Version 1, Functional Specification," Request for Comments (RFC) 2205 of the Internet Engineering Task Force (IETF), September 1997. In general, RSVP can be used to reserve resources in order to achieve a desired quality of service (QoS) for a particular kind of traffic. Resource reservations established using RSVP messages expire over time unless the reservations are refreshed.

RSVP defines sessions and flow descriptors. A session encompasses a data flow that is identified by its destination. A flow descriptor is a resource reservation that encompasses a filter specification (filterspec) and a flow specification (flowspec). When the reservation is implemented at a router, packets that pass a filter defined by the filterspec are treated as defined by the flowspec. RSVP operation is controlled using Path messages and Resv (reservation) messages.

In general, RSVP operation at a host such as a router proceeds as follows. A sender issues a Path message; a receiver receives the message, which identifies the sender. As a result, the receiver acquires reverse path information and may start sending Resv messages to reserve resources at intermediate hosts. The Resv messages propagate through the Internet and arrive at the sender. The sender then starts sending data packets and the receiver receives them.

In some cases, the only paths existing between the sender and receiver contain one or more firewalls. In order for data packets to pass through a firewall, the firewall might need to be configured to allow a certain class of data packets of pass through the firewall; the firewall's policy might need to be changed. For example, the firewall's policy might need to be changed to expressly allow data packets that originate from the sender's Internet Protocol (IP) address to be forwarded to devices that lie on the other side of the firewall from the sender.

However, firewalls are implemented for a good reason: to keep unauthorized data flows from invading portions of a network. If the general public were permitted to alter the firewall's policy, then the purpose of the firewall would be defeated. Only certain entities should be allowed to alter the firewall's policy. If a firewall is to remain sound, the firewall must require some proof that each entity that attempts to alter the firewall's policy is actually authorized to do so.

In theory, the firewall could use an authentication system like Kerberos to authenticate each entity that attempted to alter the firewall's policy. However, such an authentication system would be separate from RSVP. If Kerberos were used in conjunction with RSVP, then both RSVP messages and Kerberos messages would be passing through the network. Available network bandwidth would be reduced. Furthermore, because of the separate nature of the RSVP and Kerberos protocols, there would be some delay between the RSVP resource-reservation operations and the Kerberos authentication operations. A significant amount of time might need to pass between the time that the sender begins using RSVP to reserve resources along a path, and the time that the sender can begin sending data packets along that path. Implementing a solution that used multiple separate protocols for different purposes would be complex and require a high degree of skill and organization.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
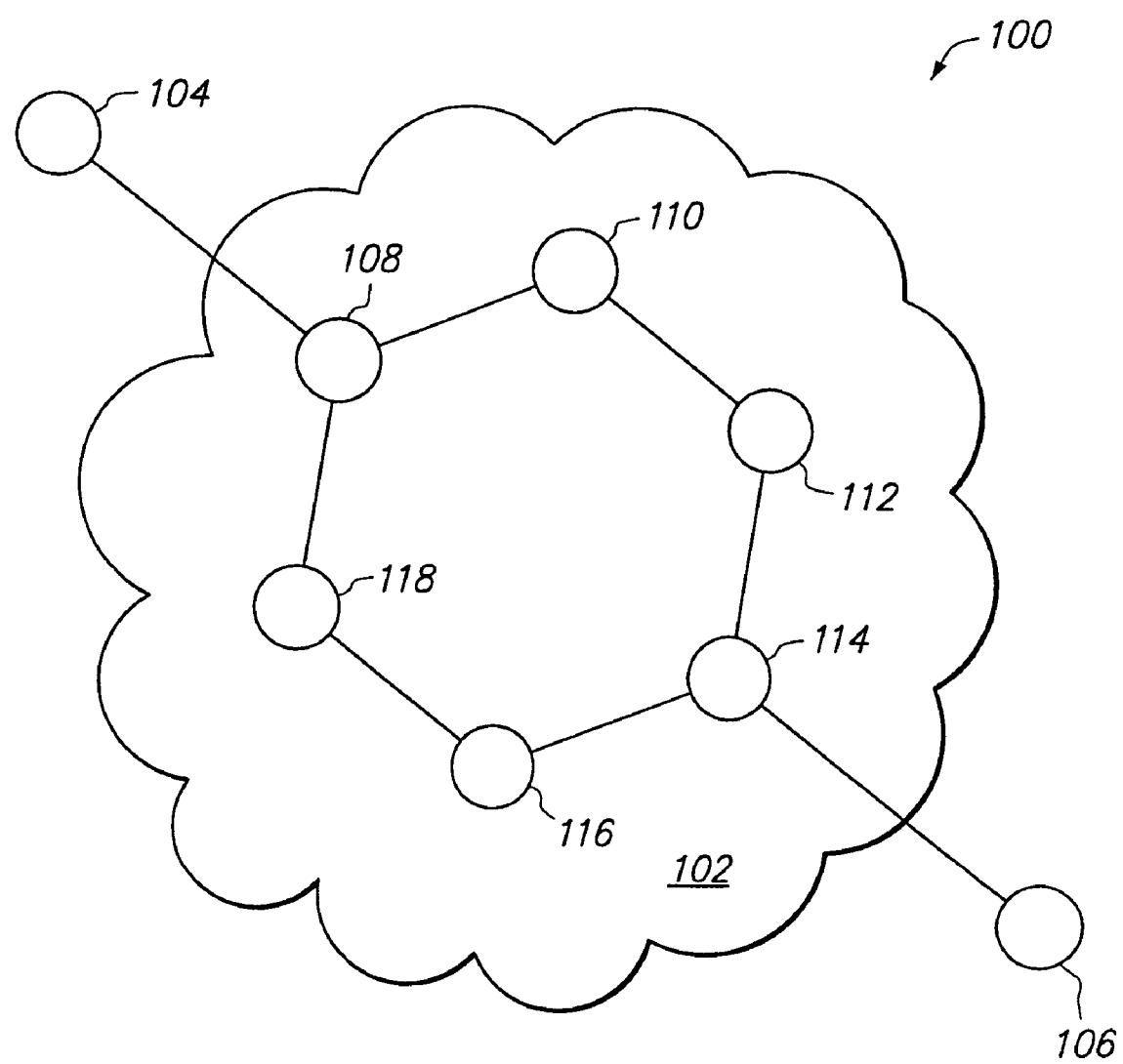
FIG. 1 is a block diagram that illustrates an overview of a system in which a combined peer-discovery, authentication, and authorization protocol is used for on-path signaling.

A method and apparatus for cryptographic peer discovery, authentication, and authorization for on-path signaling is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Examples
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a method for cryptographic peer discovery, authentication, and authorization for on-path signaling.

According to one embodiment, the method includes at least the following steps, which may be performed by an intermediary network device such as a router, firewall, or network address translator, for example; in other embodiments, the method may include additional or alternative steps. One or more data packets are intercepted at an intermediary network device. Rather than being addressed to the intermediary network device, the data packets (e.g., IP data packets) are addressed to a destination device other than the intermediary network device.

The data packets collectively contain certain information. Among this information are a group identifier and a request. For example, the request may ask the intermediary network device to allocate sufficient resources to a particular data flow so that the particular data flow will be communicated with at least a specified QoS. For another example, the request may ask a firewall to allow a particular data flow to pass through.

One or more different shared secret cryptographic keys are stored at the intermediary network device. Each cryptographic key is mapped to a different group identifier. From among these keys, a particular key is selected—the key that is mapped to the group identifier that was contained in the intercepted data packets.

A first message is sent toward an "upstream" device from whence the data packets came. The first message contains, at least, a challenge. A second message is received in response to the first message. The second message contains, at least, a response to the challenge.

A verification value is generated based, at least, on the particular key and the first challenge. A comparison is made between the verification value and the response. If the verification value matches the response, then the challenge has been satisfied, and the upstream device is authentic. In some embodiments, some of which are described in greater detail below, one or more additional steps are also taken whereby the upstream device can ascertain the authenticity of the intermediary network device.

One or more separate sets of authorizations are stored on the intermediary network device. Each set is mapped to a group identifier; different sets may be mapped to different group identifiers, and some sets may be mapped to more than one group identifier. Each set indicates the extent to which the intermediary network device's policy is permitted to be modified by an entity that is within a group that is associated with the group identifier that is mapped to that set.

If the upstream device is authentic, then the following steps are performed. From among the sets of authorizations, a particular set is selected—the set that is mapped to the group identifier that was contained in the intercepted data packets. A determination is made as to whether the request that was contained in the intercepted data packets is allowed by the selected set of authorizations. If the request is allowed, then the intermediary network device's policy is configured based on the request. For example, a firewall's policy may be configured to allow the forwarding of data packets that belong to a specified data flow. For another example, the intermediary network device's policy may be configured in such a way that data packet that belong to a specified data flow will be communicated with at least a specified QoS.

Because the group identifier is associated with a shared secret cryptographic key that is stored on the intermediary network device, cryptographic keys do not need to be exchanged between network devices every time that a network device needs to be authenticated. Because the cryptographic key is associated with a group of entities that are associated with the group identifier, fewer cryptographic keys need to be maintained.

Moreover, because the request and the group identifier are carried together, there is no need for separate resource reservation and authentication protocols to be used in the network. As a result, fewer messages are needed to achieve the desired reservation and authentication purposes, and less network bandwidth is consumed in the process.

In other aspects, the invention encompasses a computer apparatus and a computer-readable medium configured to carry out the foregoing steps.

2.0 Structural and Functional Overview

FIG. 1 is a block diagram that illustrates an overview of a system 100 in which a combined peer-discovery, authentication, and authorization protocol is used for on-path signaling. System 100 comprises a network 102, source device 104, destination device 106, and intermediary network devices 108-118. The term "network device" as used herein encompasses the term "network element."

Network 102 may be a computer network such as a local area network (LAN), a wide area network (WAN), or an internetwork such as the Internet. Intermediary network devices 108-118 may be network elements such as network routers, network switches, network bridges, network address translators, firewalls, etc. Intermediary network devices 108-118 may differ from each other. Source device 104 and destination device 106 may be hosts of any kind. Source device 104 and destination device 106 may be personal computers with network interfaces.

As shown in FIG. 1, source device 104 can only communicate with destination device 106 via one or more of intermediary network devices 108-118. Therefore, data packets that source device 104 sends to destination device 106 over network 102 travel through some path that contains one or more of intermediary network devices 108-118.

At least some of source device 104, destination device 106, and intermediary network devices 108-118 are members of a group. Different devices may be members of different groups, and some devices may be members of more than one group. Each group is associated with a different group identifier. For example, intermediary network devices 108, 110, and 118 may be members of a group whose group identifier is "1." Intermediary network devices 110-114 may be members of a group whose group identifier is "2." Intermediary network devices 112-116 may be members of a group whose group identifier is "3." Intermediary network devices 114-118 may be members of a group whose group identifier is "4." Intermediary network devices 116, 118, and 108 may be members of a group whose group identifier is "5."

Each group identifier is associated with a different shared secret cryptographic key. Each shared secret cryptographic key is stored locally on the devices that are members of the group whose group identifier is associated with that shared secret cryptographic key. According to one embodiment, no shared secret cryptographic key is possessed by any network device that is not a member of the group whose group identifier is associated with that shared secret cryptographic key. Therefore, using the above example, the cryptographic key that is associated with the group identifier of "1" would be stored on intermediary network devices 108, 110, and 118, but not on intermediary network devices 112-116.

In one embodiment, each intermediary network device stores mappings between the cryptographic keys that are stored on that device, and the group identifiers that are associated with those cryptographic keys. Therefore, using the above example, intermediary network device 108 would store three different cryptographic keys, a mapping between the first cryptographic key and the group identifier of "1," a mapping between second cryptographic key and the group identifier of "2," and a mapping between the third cryptographic key and the group identifier of "6."

In one embodiment, each group identifier is also mapped to a set of authorizations, or "authorization set." Different group identifiers can be mapped to different authorization sets, and a particular authorization set may be mapped to more than one group identifier. Intermediary network devices 108-118 each store mappings between the group identifiers of the groups to which those devices belong and the corresponding authorization sets.

According to one embodiment, before source device 104 sends substantive data toward destination device 106, source device 104 uses an on-path signaling protocol to reserve resources along a network path over which the substantive data will be communicated. The on-path signaling protocol discussed herein is called the "Network Layer Signaling" (NLS) Protocol. Some features of the NLS Protocol are disclosed in an IETF Network Working Group Internet Draft which, at the time of the filing of the present patent application, is found at the following URL: http://www.ietf.org/internet-drafts/draft-shore-nls-t1-00.txt. The NLS Protocol works through the mechanism of NLS messages. NLS messages may be carried within the data packets of lower-level protocols, such as IP. An example of the use of the NLS protocol is provided below.

For example, sender device 104 may send an NLS message within an IP packet that is addressed to an IP address that is associated with destination device 106. Intermediary network device 108 may intercept the IP packet, determine that the IP packet contains an NLS message, and determine whether authentication needs to occur between source device 104 and intermediary network device 108.

Assuming that no authentication needs to occur between these two devices, intermediary network device 108 may determine a request that is contained in the NLS message. For example, the request may ask each intermediary network device to reserve specified resources for a specified data flow. Intermediary network device 108 may allocate the requested resources for the specified data flow, and then forward the IP packet towards a next hop that is associated with the destination IP address, as indicated in the routing tables of intermediary network device 108. For example, intermediary network device 108 may forward the IP packet toward intermediary network device 110.

Some network devices in network 102 might not recognize the NLS Protocol. For example, intermediary network device 110 might not be able to determine that the IP packet contains an NLS message. Therefore, without allocating any resources, intermediary network device 110 may simply forward the IP packet towards a next hop that is associated with the destination IP address, as indicated in the routing tables of intermediary network device 110. For example, intermediary network device 110 may forward the IP packet toward intermediary network device 112.

Both intermediary network devices 112 and 114 may be NLS-aware. Furthermore, intermediary network device 114 may be, or implement, a firewall. Upon inspecting the NLS message, intermediary network device 114 may determine that the request in the NLS message asks for a "pinhole" to be opened in each firewall along the path, so that a data flow that satisfies specified criteria can pass through each firewall along the path. Before intermediary network device 114 modifies its policy to allow the specified network traffic to be forwarded through, intermediary network device 114 may engage in a mutual authentication process with the device from which the NLS message was received—namely, intermediary network device 112.

The mutual authentication process in which intermediary network devices 112 and 114 engage involves a group identifier of a group to which both devices belong. In this case, using the above example, both devices mutually belong to two different groups: group "2" and group "3," referring to the group identifiers of those groups. One of these group identifiers is selected and used in the mutual authentication process. The mutual authentication process also involves the shared secret cryptographic key that is mapped to the selected group identifier. An example of one implementation of the mutual authentication process is described below with reference to FIG. 2.

If the mutual authentication process is successful, then, at the conclusion of the mutual authentication process, both intermediary network devices 112 and 114 are assured of the other's authenticity. Intermediary network device 114 then selects, based on locally stored mappings, an authorization set that is mapped to the group identifier that was used in the mutual authentication process. Intermediary network device 114 determines whether the request contained in the NLS message falls within the boundaries of the policy modifications that can be made, according to the selected authorization set. Assuming that the request is allowable, intermediary network device 114 modifies its policy as indicated in the request, and then forwards the IP packet to destination device 106. For example, intermediary network device 114 may modify its policy by making an exception to its firewall policy and by allocating requested resources to a specified data flow.

Destination device 106 receives the IP packet. According to one embodiment, the network path through which data flows from source device 104 to destination device 106 can differ from the network path through which data flow back from destination device 106 to source device 104. In such an embodiment, network device 106 may send, toward source device 104, another IP packet that contains another NLS message. Whereas the IP packet sent from source device 104 might have traveled the path comprising intermediary network devices 108, 110, 112, and 114, the IP packet sent from destination device 106 might travel a path comprising intermediary network devices 114, 116, 118, and 108, for example. Thus, the techniques described herein can be used to reserve resources and authenticate intermediary network devices along either symmetrical or asymmetrical routes.

The techniques described herein can be used to authenticate intermediary network devices along a route even under circumstances where the sender (e.g., source device 104) does not know the route before the intermediary network devices along the route are authenticated. The NLS messages perform a peer-discovery function. The pre-organization of intermediary network devices into groups, and the pre-sharing of secret cryptographic keys among intermediary network devices that are potential next hops relative to each other, make this "spontaneous" style of authentication possible.

3.0 Implementation Examples

Figure 2:
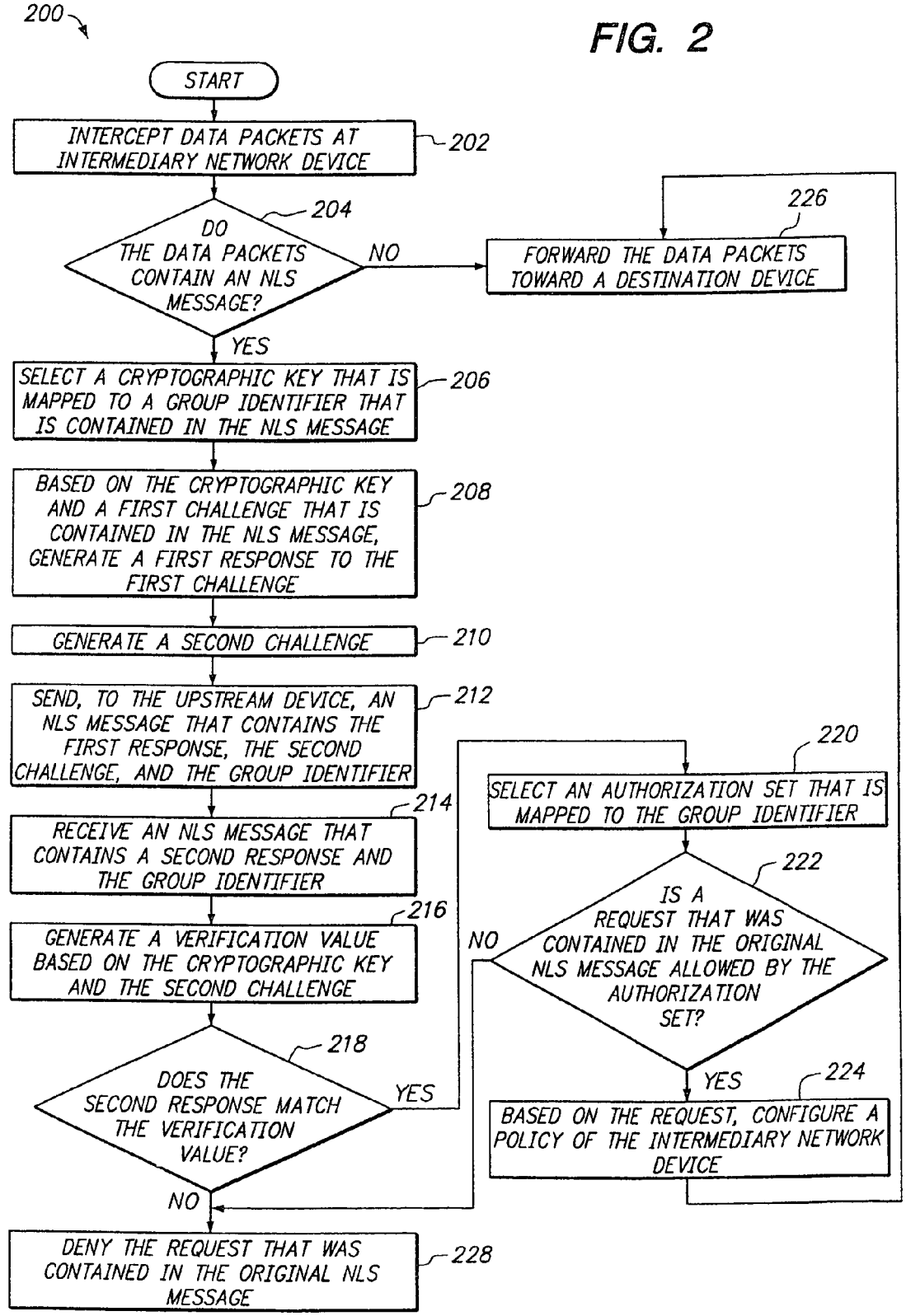
FIG. 2 depicts a flow diagram that illustrates one embodiment of a method whereby two intermediary network devices authenticate each other using a shared secret cryptographic key and group identifier.

FIG. 2 depicts a flow diagram 200 that illustrates one embodiment of a method whereby two intermediary network devices authenticate each other using a shared secret cryptographic key and group identifier. For example, any of intermediary network devices 108-118, shown in FIG. 1, may perform the method shown. The method encompasses a mutual authentication process as described above.

Referring to FIG. 2, in block 202, one or more data packets are intercepted at an intermediary network device. The data packets are addressed to a destination device that is separate from the intermediary network device. For example, intermediary network device 114 may intercept an IP packet that intermediary network device 112 sent. The IP packet may specify a destination IP address that is associated with destination device 106.

In block 204, it is determined whether the data packets collectively contain an NLS message. Continuing the example, intermediary network device 114 may determine whether the IP packet contains an NLS message. The NLS message may be identified by a specified bit pattern that occurs at the start of every NLS message, for example. If the data packets collectively contain an NLS message, then control passes to block 206. Otherwise, control passes to block 226.

In block 206, a secret cryptographic key that is mapped to a group identifier is selected. The group identifier is contained in the NLS message, but the secret cryptographic key is not. Continuing the example, intermediary network device 114 may consult locally stored mappings and determine that a particular cryptographic key is associated with the group identifier that is contained in the NLS message. If the NLS message contains more than one group identifier that corresponds to a group to which intermediary network device 114 belongs, then intermediary network device 114 may choose one of those group identifiers to be the "active" group identifier, and ignore the others.

In block 208, a first response to a first challenge is generated. The first challenge is contained in the NLS message. The first response is generated based on both the secret cryptographic key and the first challenge. Continuing the example, the first challenge may be a random nonce that intermediary network device 112 generated. Intermediary network device 114 may generate the first response by inputting both the "first" NLS message (including the first challenge) and the secret cryptographic key into a cryptographic function such as HMAC SHA1 (Keyed Hashing for Message Authentication). The output of the cryptographic function is the first response. In one embodiment, the cryptographic function is chosen such that the inputs to the cryptographic function cannot be derived mathematically from the output of the cryptographic function.

In block 210, a second challenge is generated. Continuing the example, intermediary network device 114 may generate a random nonce and use the nonce as the second challenge.

In block 212, an NLS message is sent to the upstream device from whence the data packets, intercepted in block 202, were sent. This "second" NLS message contains the group identifier, the first response, and the second challenge. Continuing the example, intermediary network device 114 may send such a "second" NLS message toward intermediary network device 112.

Intermediary network device 112 also stores a copy of the secret cryptographic key that is mapped to the group identifier. Upon receiving the "second" NLS message from intermediary network device 114, intermediary network device 112 may verify the correctness of the first response by inputting (a) the secret cryptographic key that is mapped to the group identifier, and (b) a copy of the "first" NLS message that intermediary network device 112 previously sent to intermediary network device 114, into the same cryptographic function that intermediary network device 114 used to generate the first response. If the output of the cryptographic function matches the first response, then intermediary network device 112 "knows" that intermediary network device 114 is authentic.

Intermediary network device 112 may generate a second response to the second challenge by inputting both the "second" NLS message received from intermediary network device 114 (including the second challenge) and the secret cryptographic key into the cryptographic function. The output of the cryptographic function is the second response. Intermediary network device 112 may send both the second response and the group identifier to intermediary network device 114 in a "third" NLS message.

In block 214, an NLS message is received. The NLS message contains the second response and the group identifier. Continuing the example, intermediary network device 114 may receive the "third" NLS message that intermediary network device 112 sent.

In block 216, a verification value is generated. The verification value is generated based on both (a) the secret cryptographic key that is mapped to the group identifier and (b) the second challenge. Continuing the example, intermediary network device 114 may generate the verification value by inputting both the secret cryptographic key and a copy of the "second" NLS message (including the second challenge) into the cryptographic function. The output of the cryptographic function is the verification value.

In block 218, it is determined whether the second response matches the verification value. For example, intermediary network device 114 may compare the second response with the verification value. If the second response matches the verification value, then intermediary network device 114 "knows" that intermediary network device 112 is authentic, and control passes to block 220. Otherwise, control passes to block 228.

In block 220, an authorization set that is mapped to the group identifier is selected. Continuing the example, intermediary network device 114 may consult locally stored mappings and determine that a particular authorization set is mapped to the group identifier.

In block 222, it is determined whether a request is allowed by the particular authorization set. The request is contained in the NLS message that was originally received in block 202. For example, if the request asks for a "pinhole" to be opened in a firewall to allow a data flow that satisfies specified criteria to pass through the firewall, then intermediary network device 114 may determine whether a pinhole associated with the specified criteria is allowable according to the particular authorization set. It may be that the authorization set indicates that some pinholes may be opened in the firewall, but only for data flows that satisfy certain criteria, which may or may not be narrower than the criteria specified in the request.

For another example, if the request asks for resources to be allocated to a data flow that satisfies specified criteria so that the data flow will be accorded at least a certain QoS, then intermediary network device 114 may determine whether the allocation of such resources is allowable according to the particular authorization set. It may be that the authorization set indicates that some resources may be reserved for data flows that satisfy the specified criteria, but possibly not as many resources as the request asks.

Thus, different groups may be allowed different privileges in the extent to which entities within those groups are permitted to modify an intermediate network device's policy. Entities within one group may be allowed to make sweeping changes to a network device's policy, while entities within another group may be allowed to make only minor adjustments to the network device's policy.

If the request is allowed by the particular authorization set, then control passes to block 224. Otherwise, control passes to block 228.

In block 224, a policy of the intermediate network device is configured based on the request. For example, if the request asks intermediary device 114 to open a pinhole in a firewall implemented on intermediary device 114, then intermediary device 114 may adjust its firewall policy so that data flows that satisfy the criteria specified in the request will be forwarded through. For another example, if the request asks intermediary device 114 to allocate resources sufficient to accord a specified data flow a specified QoS, then intermediary device 114 may allocate as many resources (e.g., bandwidth) to such a data flow as will be necessary to accord that data flow the specified QoS.

In block 226, the data packets that were intercepted in block 202 are forwarded toward the destination device. For example, intermediary network device 114 may forward the originally intercepted IP packet toward destination device 106. Prior to doing so, intermediary network device may modify the NLS message contained within the IP packet, if the IP packet contained an NLS message.

Alternatively, in block 228, the request that is contained in the original NLS message is denied. For example, intermediary network device 114 may refuse to modify its policy (e.g., firewall and/or resource allocation) as asked in the request.

Thus, resource reservation, authentication, and authorization may be handled via the messages of a single on-path signaling protocol, thereby eliminating the need to use several different protocols to perform these functions. Because the request and the group identifier are carried together within the same message, in one embodiment, there is no need for separate resource reservation and authentication protocols to be used in the network. As a result, fewer messages are needed to achieve the desired reservation and authentication purposes, and less network bandwidth is consumed in the process.

The use of group keys allows the foregoing technique to function successfully even when "next hops" are not known beforehand, and even when network topology changes. Fewer cryptographic keys are required. The use of a single protocol rather than many protocols reduces administrative complexity.

Because very refined and specific authorization sets may be associated with group identifiers, authorizations may be very fine-grained. Because group identifiers are transmitted through the network, the authorization sets themselves do not need to be.

Figure 3:
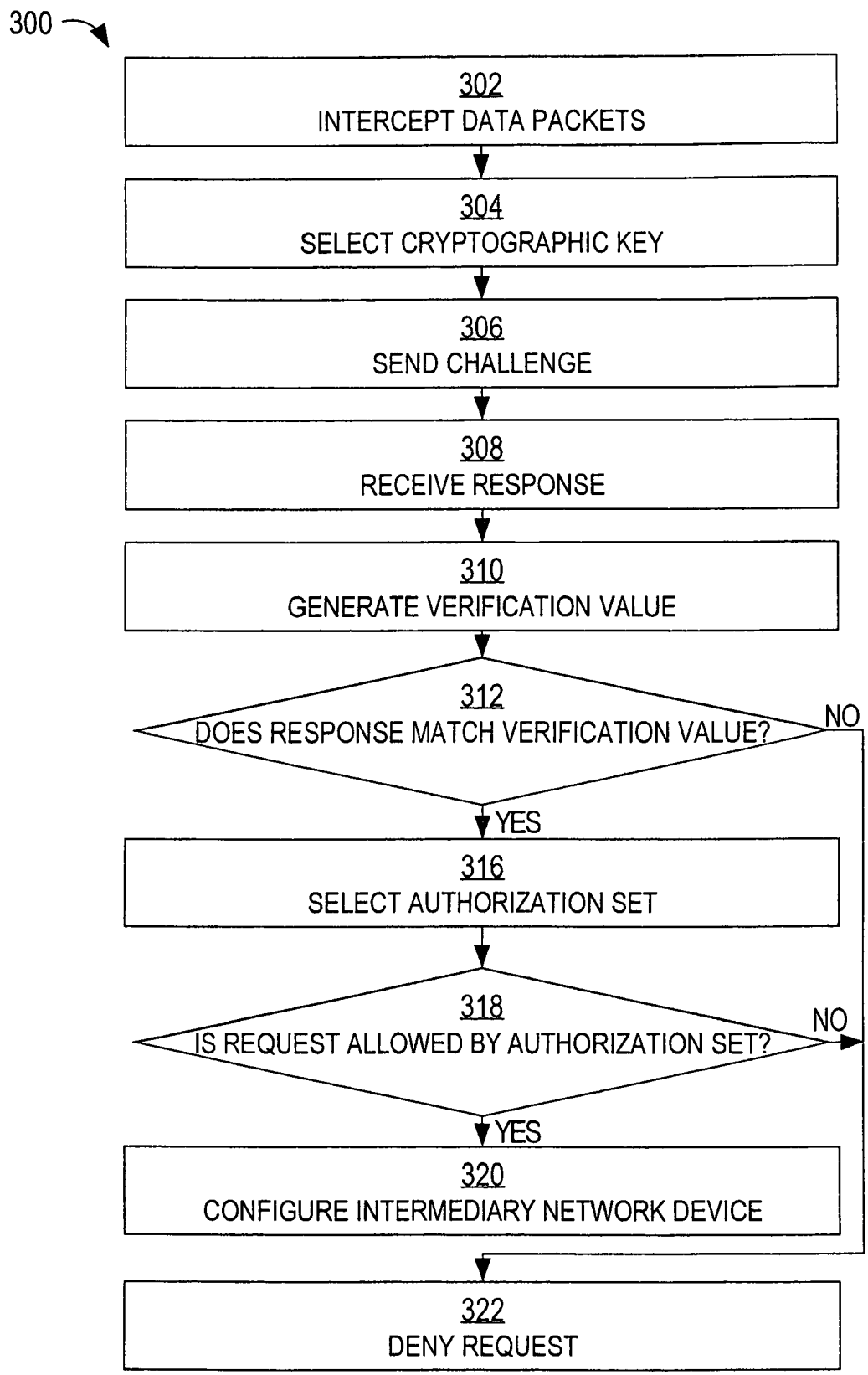
FIG. 3 depicts a flow diagram that illustrates an alternative embodiment of a method.

FIG. 3 depicts a flow diagram 300 that illustrates an alternative embodiment of a method. Referring to FIG. 3, in block 302, one or more data packets, which collectively contain a request, are intercepted. In block 304, a particular cryptographic key is selected from among one or more cryptographic keys. In block 306, a challenge is sent toward an upstream device. In block 308, a response is received. In block 310, a verification value is generated based on the particular cryptographic key and the challenge. In block 312, it is determined whether the response matches the verification value. If the response matches the verification value, then control passes to block 316. Otherwise, control passes to block 322. In block 316, a particular authorization set is selected from among one or more authorization sets. In block 318, it is determined whether the request is allowed by the particular authorization set. If the request is allowed by the particular authorization set, then control passes to block 320. Otherwise, control passes to block 322. In block 320, in response to determining that the request is allowed by the particular authorization set, an intermediary network device is configured based on the request. Alternatively, in block 322, the request is denied, and the intermediary network device is not configured based on the request.

4.0 Implementation Mechanisms—Hardware Overview

Figure 4:
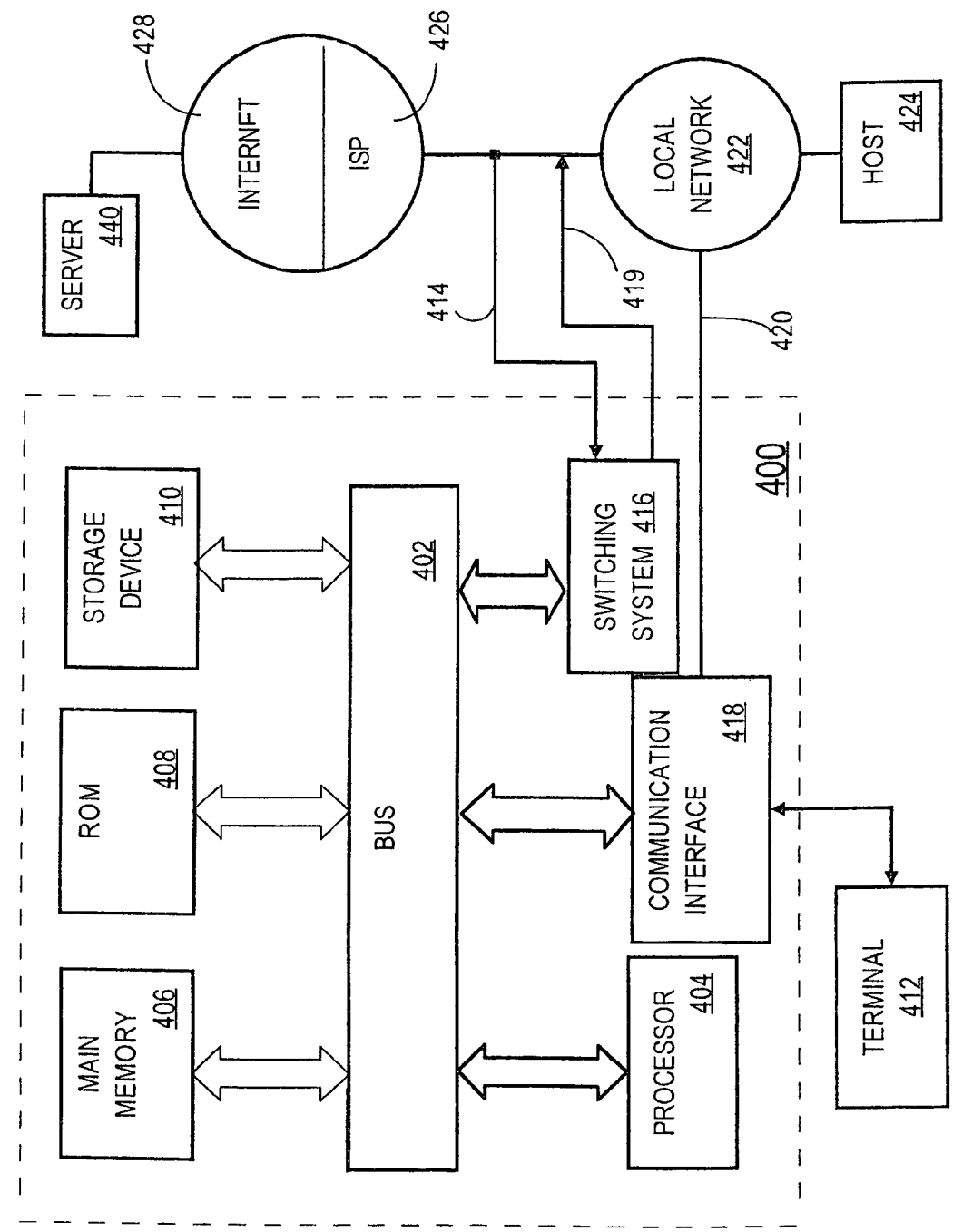
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for secure network device policy configuration on computer system 400. According to one embodiment of the invention, computer system 400 provides for such configuration in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for secure network device policy configuration as described herein.

Processor 404 may execute the received code as it is received and/or stored in storage device 410 or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for secure network device policy configuration, the method comprising the computer-implemented steps of:

storing a mapping between a group identifier and a particular cryptographic key, wherein the group identifier identifies a group of three or more network devices;

intercepting, at an intermediary network device, one or more data packets that (a) are addressed to a destination device other than the intermediary network device, (b) collectively contain a request, and (c) collectively contain the group identifier;

selecting, from among one or more cryptographic keys that are stored at the intermediary network device, the particular cryptographic key that is mapped to the group identifier;

sending, toward an upstream device that sent the one or more data packets toward the intermediary network device, a first message that contains a first challenge;

receiving a second message that contains a first response;
generating a verification value based on (a) the particular cryptographic key and (b) the first challenge;
determining whether the first response matches the verification value; and
in response to determining that the first response matches the verification value, performing particular steps comprising:
selecting, from among one or more authorization sets, a particular authorization set that is mapped to the group identifier;
determining whether the request is allowed by the particular authorization set; and
in response to determining that the request is allowed by the particular authorization set, configuring, based on the request, a policy of the intermediary network device.

2. A method as recited in claim 1, further comprising the step of:
generating a second response based on (a) the particular cryptographic key and (b) a second challenge that is collectively contained in the one or more data packets;
wherein the first message contains the second response.

3. A method as recited in claim 1, wherein the one or more data packets do not contain the particular cryptographic key.

4. A method as recited in claim 1, wherein the particular steps further comprise:
sending the one or more data packets toward the destination device.

5. A method as recited in claim 1, wherein configuring the policy of the intermediary network device comprises configuring a firewall to allow forwarding of each data flow that satisfies criteria that are specified in the request.

6. A method as recited in claim 1, wherein configuring the policy of the intermediary network device comprises configuring the intermediary network device to provide, to each data flow that satisfies criteria that are specified in the request, a quality of service that is at least as high as a quality of service that is specified in the request.

7. A method as recited in claim 1, further comprising the step of:
determining whether the one or more data packets collectively contain a particular kind of message;
wherein the step of sending the first message is performed in response to determining that the one or more data packets collectively contain the particular kind of message.

8. An apparatus for secure network device policy configuration, comprising:
means for storing a mapping between a group identifier and a particular cryptographic key, wherein the group identifier identifies a group of three or more network devices;
means for intercepting, at an intermediary network device, one or more data packets that (a) are addressed to a destination device other than the intermediary network device, (b) collectively contain a request, and (c) collectively contain the group identifier;
means for selecting, from among one or more cryptographic keys that are stored at the intermediary network device, the particular cryptographic key that is mapped to the group identifier;
means for sending, toward an upstream device that sent the one or more data packets toward the intermediary network device, a first message that contains a first challenge;
means for receiving a second message that contains a first response;
means for generating a verification value based on (a) the particular cryptographic key and (b) the first challenge;
means for determining whether the first response matches the verification value; and
means for selecting, in response to determining that the first response matches the verification value, and from among one or more authorization sets, a particular authorization set that is mapped to the group identifier;
means for determining, in response to determining that the first response matches the verification value, whether the request is allowed by the particular authorization set; and
means for configuring, in response to determining that the first response matches the verification value, in response to determining that the request is allowed by the particular authorization set, and based on the request, a policy of the intermediary network device.

9. An apparatus as recited in claim 8, further comprising:
means for generating a second response based on (a) the particular cryptographic key and (b) a second challenge that is collectively contained in the one or more data packets;
wherein the first message contains the second response.

10. An apparatus as recited in claim 8, wherein the one or more data packets do not contain the particular cryptographic key.

11. An apparatus as recited in claim 8, further comprising:
means for sending, in response to determining that the first response matches the verification value, the one or more data packets toward the destination device.

12. An apparatus as recited in claim 8, wherein the means for configuring the policy of the intermediary network device comprise means for configuring a firewall to allow forwarding of each data flow that satisfies criteria that are specified in the request.

13. An apparatus as recited in claim 8, wherein the means for configuring the policy of the intermediary network device comprise means for configuring the intermediary network device to provide, to each data flow that satisfies criteria that are specified in the request, a quality of service that is at least as high as a quality of service that is specified in the request.

14. An apparatus as recited in claim 8, further comprising:
means for determining whether the one or more data packets collectively contain a particular kind of message;
wherein the means for sending the first message are means for sending the first message in response to determining that the one or more data packets collectively contain the particular kind of message.

15. An apparatus for secure network device policy configuration, comprising:
a network interface that is coupled to a data network for receiving one or more packet flows therefrom;
a processor;
one or more stored sequences of instructions which, when executed by the processor, cause the processor to carry out the steps of:
storing a mapping between a group identifier and a particular cryptographic key, wherein the group identifier identifies a group of three or more network devices;
intercepting, at an intermediary network device, one or more data packets that (a) are addressed to a destination device other than the intermediary network device, (b) collectively contain a request, and (c) collectively contain the group identifier;

selecting, from among one or more cryptographic keys that are stored at the intermediary network device, the particular cryptographic key that is mapped to the group identifier;

sending, toward an upstream device that sent the one or more data packets toward the intermediary network device, a first message that contains a first challenge;

receiving a second message that contains a first response;

generating a verification value based on (a) the particular cryptographic key and (b) the first challenge;

determining whether the first response matches the verification value; and in response to determining that the first response matches the verification value, performing particular steps comprising:

selecting, from among one or more authorization sets, a particular authorization set that is mapped to the group identifier;

determining whether the request is allowed by the particular authorization set; and in response to determining that the request is allowed by the particular authorization set, configuring, based on the request, a policy of the intermediary network device.

16. An apparatus as recited in claim 15, wherein the one or more sequences of instructions further comprise instructions which, when executed by the processor, cause the processor to carry out the steps of:

generating a second response based on (a) the particular cryptographic key and (b) a second challenge that is collectively contained in the one or more data packets;

wherein the first message contains the second response.

17. An apparatus as recited in claim 15, wherein the one or more data packets do not contain the particular cryptographic key.

18. An apparatus as recited in claim 15, wherein the one or more sequences of instructions further comprise instructions which, when executed by the processor, cause the processor to carry out the steps of:

sending the one or more data packets toward the destination device.

19. An apparatus as recited in claim 15, wherein configuring the policy of the intermediary network device comprises configuring a firewall to allow forwarding of each data flow that satisfies criteria that are specified in the request.

20. An apparatus as recited in claim 15, wherein configuring the policy of the intermediary network device comprises configuring the intermediary network device to provide, to each data flow that satisfies criteria that are specified in the request, a quality of service that is at least as high as a quality of service that is specified in the request.

21. An apparatus as recited in claim 15, wherein the one or more sequences of instructions further comprise instructions which, when executed by the processor, cause the processor to carry out the steps of:

determining whether the one or more data packets collectively contain a particular kind of message;

wherein the step of sending the first message is performed in response to determining that the one or more data packets collectively contain the particular kind of message.

* * * * *